US012042924B2

(12) United States Patent
Alger

(10) Patent No.: US 12,042,924 B2
(45) Date of Patent: Jul. 23, 2024

(54) COLLAPSIBLE PORTABLE TABLE SAW STAND

(71) Applicant: Toby Alger, Wilmington, NC (US)

(72) Inventor: Toby Alger, Wilmington, NC (US)

( * ) Notice: Subject to any disclaimer, the term of this patent is extended or adjusted under 35 U.S.C. 154(b) by 331 days.

(21) Appl. No.: 17/695,537

(22) Filed: Mar. 15, 2022

(65) Prior Publication Data

US 2022/0288768 A1 Sep. 15, 2022

Related U.S. Application Data

(60) Provisional application No. 63/161,427, filed on Mar. 15, 2021.

(51) Int. Cl.
*B25H 1/04* (2006.01)

(52) U.S. Cl.
CPC .................................... *B25H 1/04* (2013.01)

(58) Field of Classification Search
CPC ............... B25H 1/04; B25H 1/02; B25H 1/06
USPC ........................................................ 83/477.2
See application file for complete search history.

(56) References Cited

U.S. PATENT DOCUMENTS 4,319,663 A * 3/1982 Barden .................... B25H 1/06 269/254 R
5,452,908 A * 9/1995 Bencic ..................... B25H 1/12 280/47.35
2002/0179181 A1* 12/2002 Murphy .................. B25H 1/04 144/286.5
2019/0240858 A1* 8/2019 Torres ....................... B27B 5/29
2020/0230800 A1* 7/2020 Dargaud .................. B25H 1/06
2020/0298390 A1* 9/2020 Wise .................... B23D 47/025
2020/0391372 A1* 12/2020 Strempke ............... B25H 3/006
2022/0288768 A1* 9/2022 Alger ........................ B25H 1/06
2023/0211491 A1* 7/2023 Simmons ................. B25H 1/18 144/286.1
2023/0294267 A1* 9/2023 Dupin ....................... B25H 1/12 182/153

* cited by examiner

*Primary Examiner* — Omar Flores Sanchez
(74) *Attorney, Agent, or Firm* — Nath, Goldberg & Meyer; Joshua B. Goldberg

(57) ABSTRACT

The collapsible and portable table saw stand supports an electric table saw, while also providing an outfeed table for supporting a work piece at the same level as the top of the table saw. The table saw stand includes a front and a rear spaced apart sawhorse type structures with two lower and two upper longitudinal members extending between the legs of the sawhorses. The front sawhorse type structure is shorter than the rear, while a third shortened sawhorse type structure extends upwardly from the two upper longitudinal members between the front and rear sawhorses. Two longitudinal clamping jaws extend from the top of the third shortened sawhorse type structure to the top of the taller sawhorse type structure. The clamping jaws support the outfeed table by grasping a central keel of the outfeed table. The two upper longitudinal members support a table saw in front of the outfeed table.

11 Claims, 9 Drawing Sheets

COLLAPSIBLE PORTABLE TABLE SAW STAND

CROSS-REFERENCE TO RELATED APPLICATION

This application claims the benefit of U.S. Provisional Patent Application No. 63/161,427, filed on Mar. 15, 2021.

BACKGROUND

1. Field

The disclosure of the present patent application relates to work stands, and particularly to a collapsible, portable table saw stand.

2. Description of the Related Art

In general, collapsible and portable work supports such as sawhorses are useful for supporting one or more boards or other items, while they are modified using hand tools such as drills, saws, etc. One portable work support based on sawhorse-type structures is the table for portable miter saws as shown and described in the inventor's previous U.S. Pat. No. 7,240,705 B2, issued Jan. 24, 2005, which is hereby incorporated by reference in its entirety. The table includes a hinged table surface from which depends a centrally located, longitudinal keel, the keel being releasably clamped by a sawhorse-like collapsible stand of two opposed leg assemblies. In its operative position, the stand forms a keel gap or slot within which the longitudinal keel snugly fits, thereby supporting the table surface. Levelers can be provided for supporting a workpiece above the tabletop surface. Although stands for portable table saws are known, such stands generally do not provide a separate supporting surface for a workpiece.

Thus, a collapsible portable table saw stand solving the aforementioned problems is desired.

SUMMARY

The collapsible portable table saw stand, supports a table saw, while also providing an outfeed table for supporting a workpiece at the same level as the work table of the table saw. The table saw stand includes front and rear spaced apart sawhorse type structures having two lower and two upper longitudinal members or beams extending between the legs of the sawhorses. The front sawhorse type structure is shorter than the rear, while a third shortened sawhorse type structure extends upward from the two upper longitudinal beams between the front and rear sawhorses. Two longitudinal clamping jaws extend from the top of the third shortened sawhorse-type structure to the top of the taller sawhorse-type structure. The clamping jaws support the outfeed table by grasping a central keel of the outfeed table. The two upper longitudinal beams support a table saw in front of the outfeed table. A spacer, or leveler, may be placed under the table saw or on top of the outfeed table to support the work piece on the outfeed table at the same level as the work table of the table saw.

These and other features of the present subject matter will become readily apparent upon further review of the following specification.

BRIEF DESCRIPTION OF THE DRAWINGS

Similar reference characters denote corresponding features consistently throughout the attached drawings.

DETAILED DESCRIPTION OF THE PREFERRED EMBODIMENTS

Figure 1:
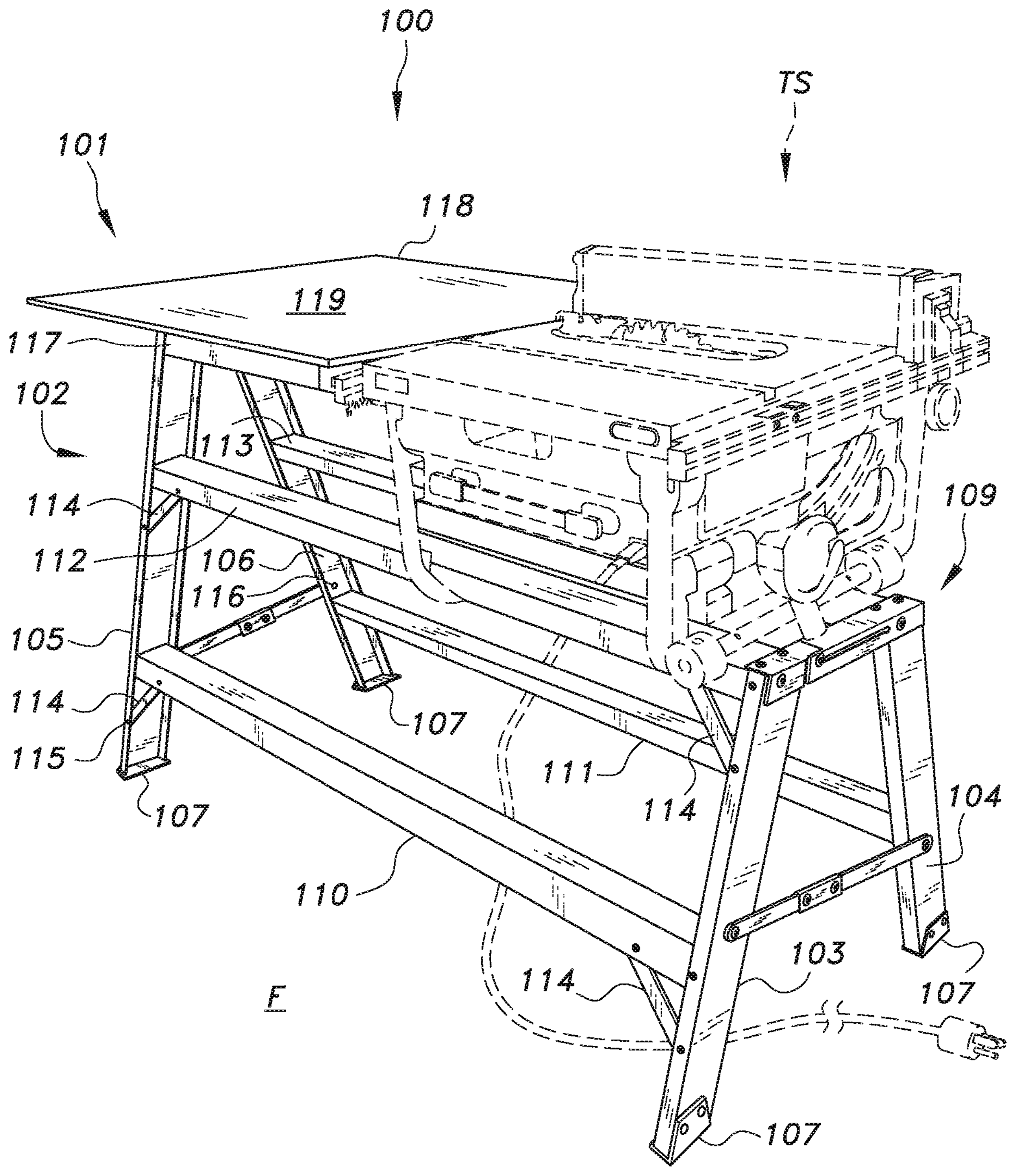
FIG. 1 is an environmental perspective view of a collapsible portable table saw stand, showing a table saw mounted on a front end thereof.

The collapsible portable table saw stand 100 includes a worktable assembly 101 and a collapsible support frame 102 for supporting the worktable assembly 101 and an electric table saw TS above a support surface or floor F, as shown in FIG. 1.

Figure 7:
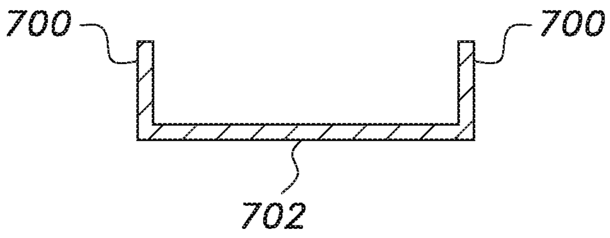
FIG. 7 is a section view along lines 7-7 of FIG. 6.
Figure 8:
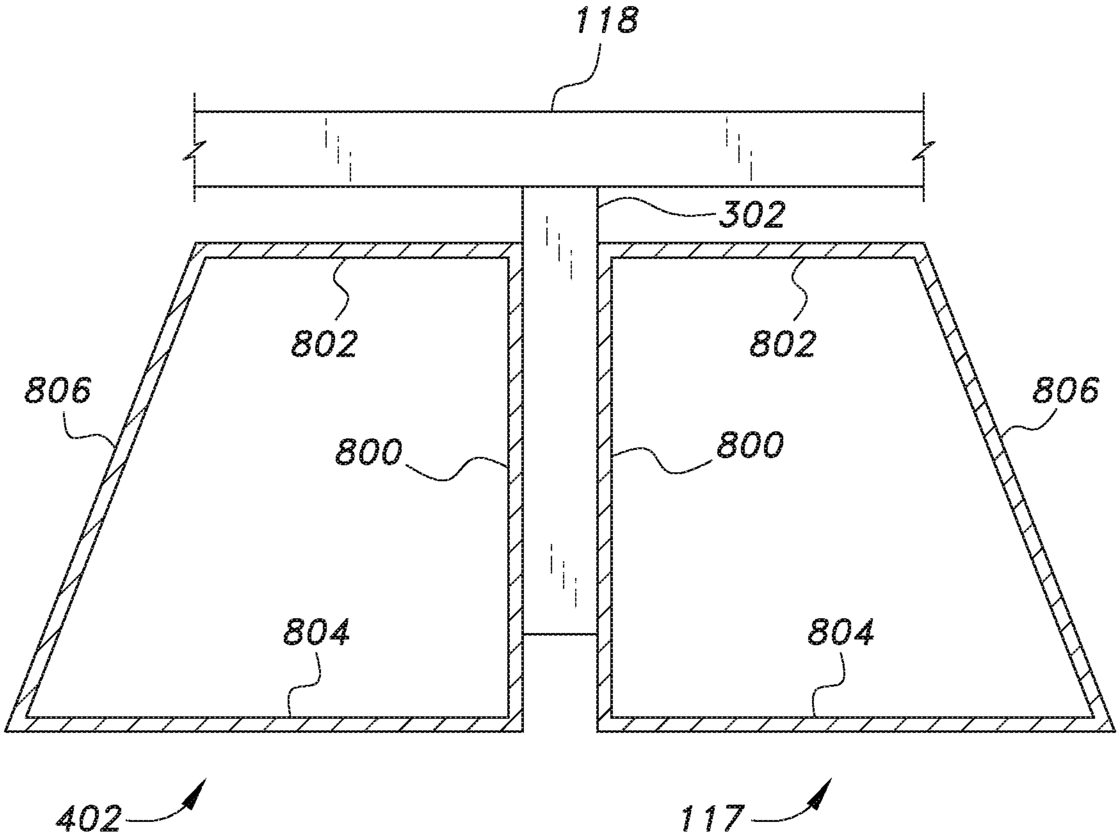
FIG. 8 is a partial section view along lines 8-8 of FIG. 2.
Figure 9:
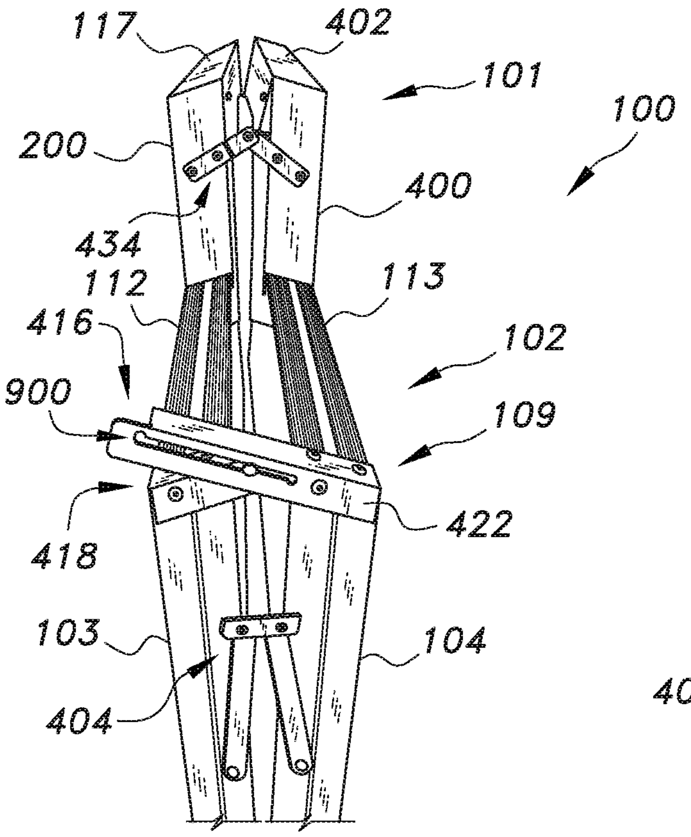
FIG. 9 is a partial front perspective view of the collapsible support frame of FIG. 6, showing the frame in a collapsed configuration.
Figure 10:
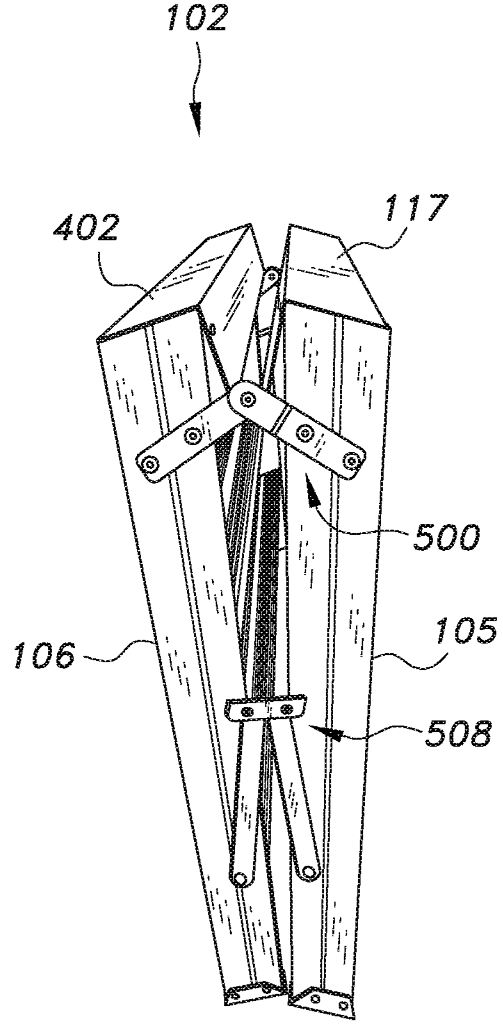
FIG. 10 is a rear, perspective view of the collapsible support frame of FIG. 6, showing the frame in a collapsed configuration.
Figure 11:
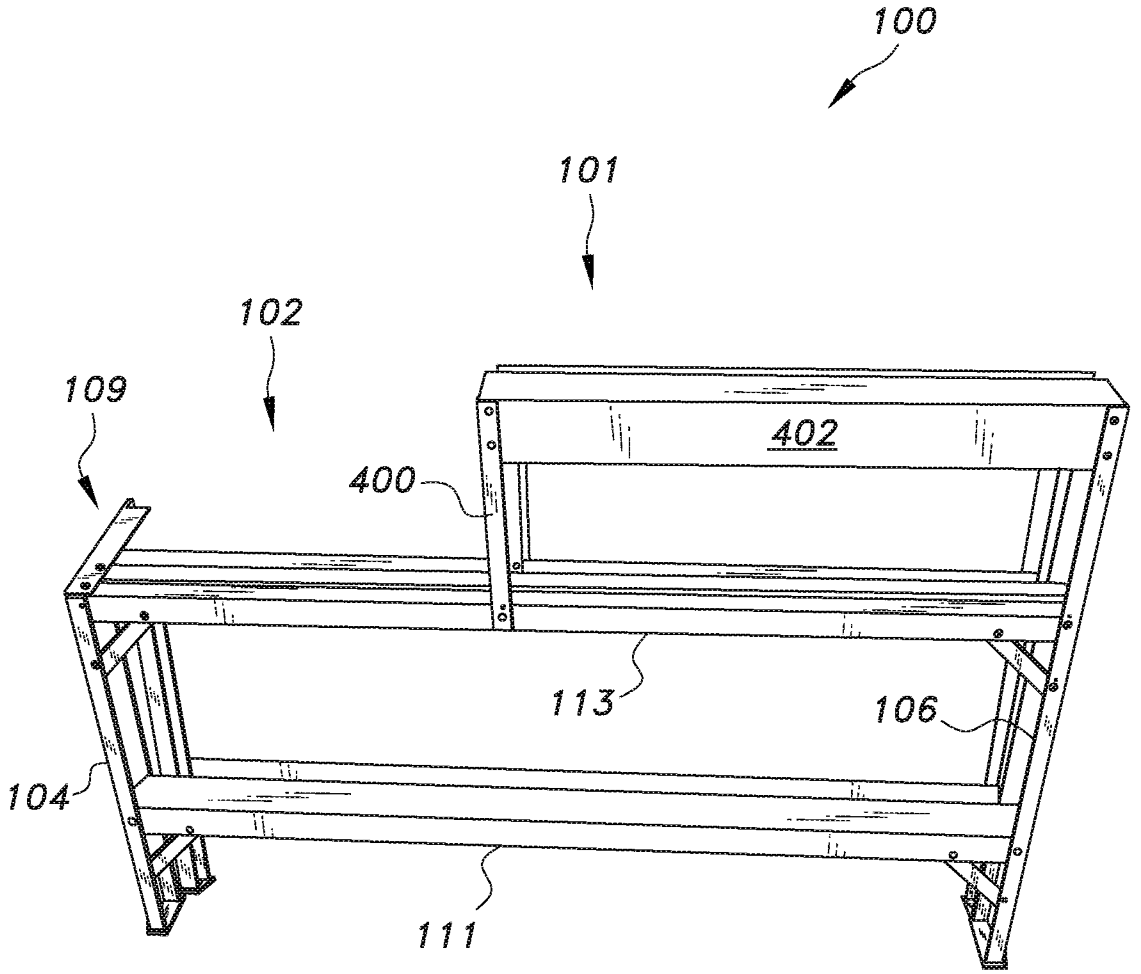
FIG. 11 is a perspective view of the collapsible support frame of FIG. 6, showing the frame in a collapsed configuration, as seen from the right side.

The details of the collapsible support frame 102 are shown in FIGS. 1-2 and 4-11. The collapsible support frame 102 has an operational configuration as shown in FIGS. 1-2 and 4-8, and a compact configuration as shown in FIGS. 9-11. The collapsible support frame 102 includes two opposed left and right-side subassemblies, the left and right-side subassemblies being substantially mirror images of one another. The left side subassembly includes a left front-end portion having a front left leg 103 with an upper portion and a lower portion and a rear end portion having a rear left leg 105 with an upper portion, a middle portion, and a lower portion. A lower cross member 110 extends between the lower portion of the front left leg 103 and the lower portion, of the rear left leg 105. A left middle cross member 112 extends between the upper portion of the front left leg 103 and the middle portion of the rear left leg 105. A left riser member 200 having an upper portion and a lower portion is attached to the left middle cross member 112 between the front-end portion and the rear end portion of the left side assembly. A left clamping jaw cross member 117 extends between the upper portion of the left riser member 200 and the upper portion of the rear left leg 105. Similarly, the right side subassembly includes a right front end portion having a front right leg 104 with an upper portion and a lower portion, and a right rear end portion having a rear right leg 106 with an upper portion, a middle portion, and a lower portion. A right lower cross member 111 extends between the lower portion of the front right leg 104 and the lower portion of the rear right leg 106. A right middle cross member 113 extends between the upper portion of the front right leg 104 and the middle portion of the rear right leg 106. A right riser member 400 having an upper portion and a lower portion is attached to the right middle cross member

Figure 4:
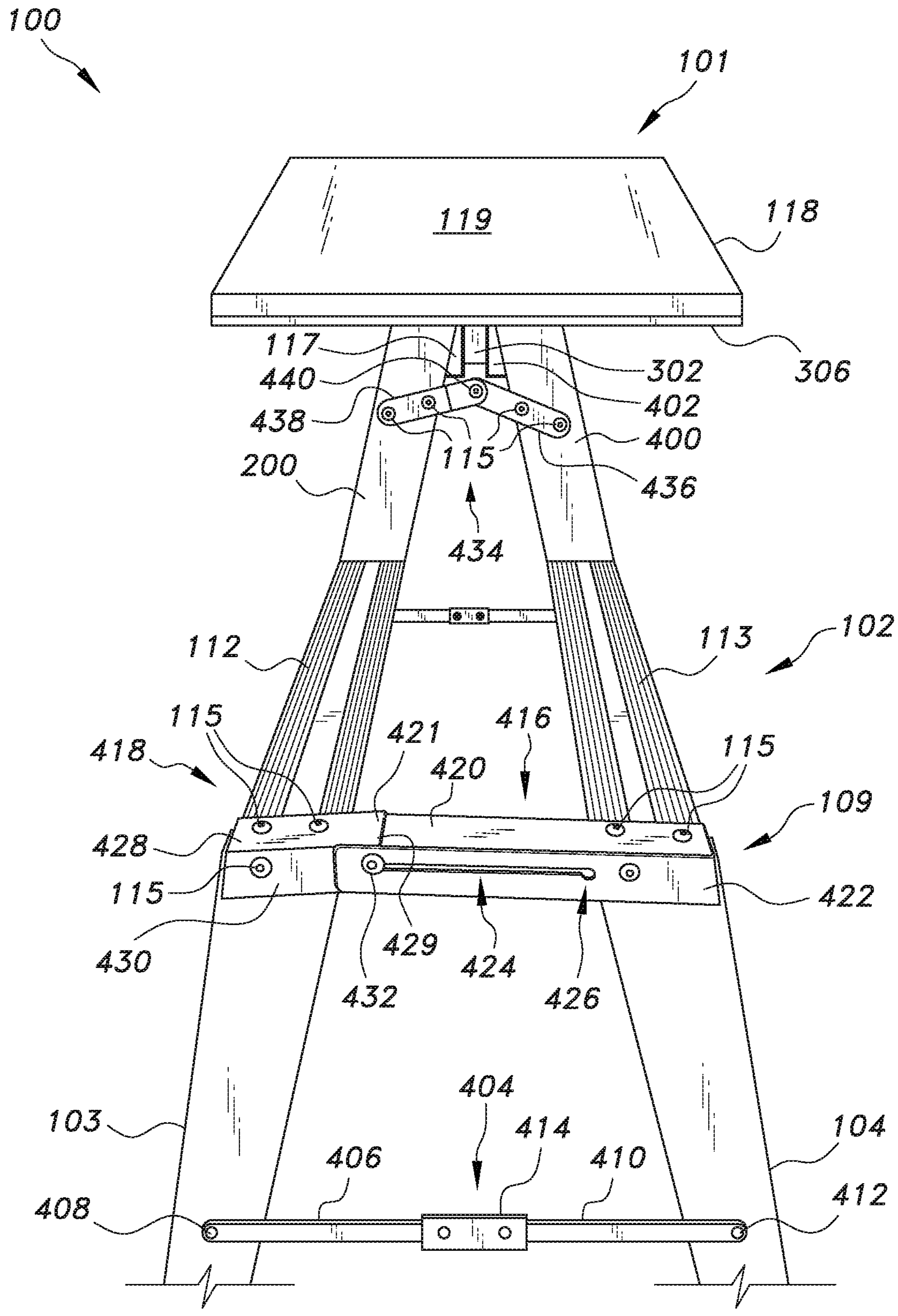
FIG. 4 is a partial front perspective view of the collapsible portable table saw stand of FIG. 1.

113 between the front end portion and the rear end portion of the right-side assembly. As shown in FIGS. 4 and 11, a right clamping jaw cross member 402 extends between the upper portion of the right riser member 400 and the upper portion of the rear right leg 106. The bottoms of all the legs 103-106 may optionally include rubber padded feet 107, to avoid slipping of the collapsible and portable table saw stand 100, and damage to the floor F. Stiffening links 114 (diagonal braces or struts), may be provided between the legs 103-106 and the cross members 110-113 to increase the stability of the stand 100. The various components of the left and right-side subassemblies are held together by screws 115 and nuts 116, although rivets or other fasteners may be used.

The cross sections of legs 103-106 and the riser members 200, 400 are shown in FIG. 7. In this embodiment, the legs include a relatively wide elongate strip 702, with two relatively narrow strips 700 or elongate flanges extending upward and at right angles to the relatively wide elongate strip 702, defining a U- or C-shaped channel, although other shapes are possible.

Figure 6:
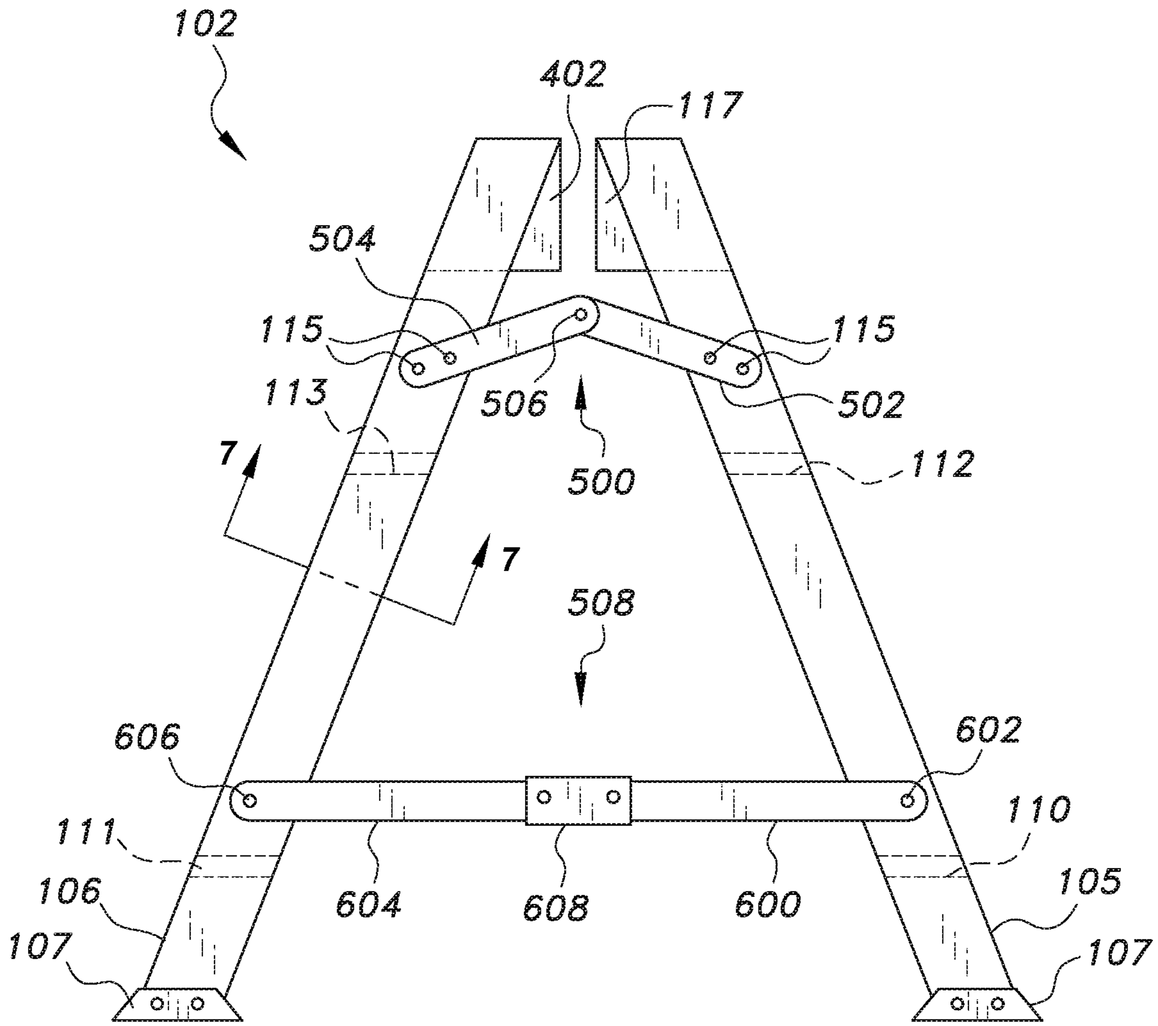
FIG. 6 is a rear elevational view of a collapsible support frame of the collapsible portable table saw stand of FIG. 1.

The cross sections of the clamping jaw cross members 117, 402, when the collapsible support frame 102 is in its operational configuration, are shown in FIG. 8. The cross sections of the clamping jaw cross members 117, 402, are generally trapezoidal, having a vertical inside surface 800, a relatively short top surface 802, a relatively long bottom surface 804, and a slanted outer surface 806. The opposing vertical inside surfaces 800 form a keel gap when the collapsible support frame 102 is in its operational configuration, as described below. The slanted outer surfaces 806 abut and are supported by the outside strips or flanges 700 of the legs 105-106 and the riser members 200, 400. As best seen in FIG. 6, the inside strips 700 of the legs 105-106 and the riser members 200, 400 have portions cut out or omitted to allow the bottoms of the vertical inside surfaces 800 and the inside portions of the bottom surfaces 804, to extend beyond the inside strips 700.

Figure 5:
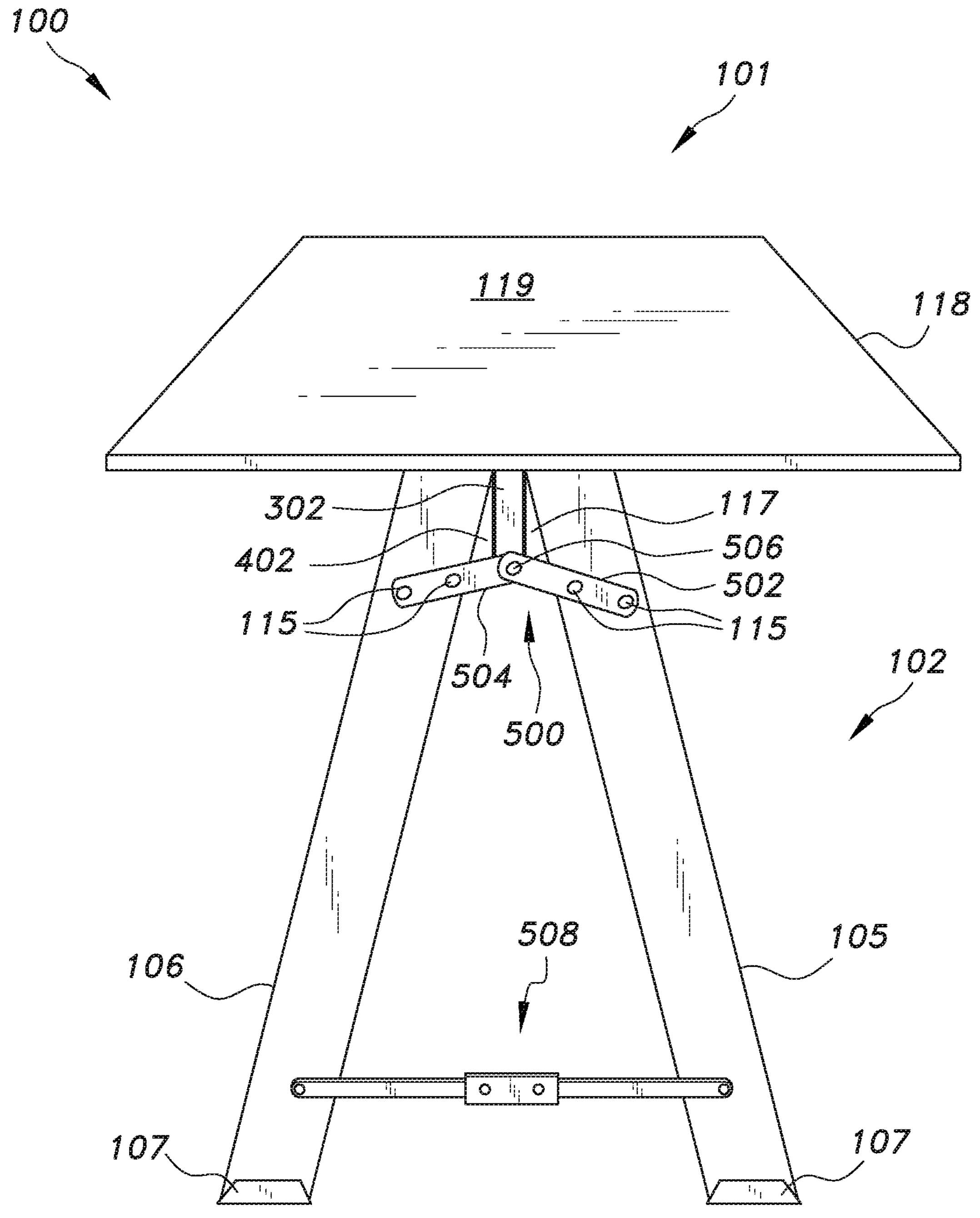
FIG. 5 is a rear perspective view of the collapsible portable table saw stand of FIG. 1.

As best seen in FIGS. 5-6 and 10, the left and right side assemblies are rotatably attached to one another at their rear ends by a hinge 500 extending between the upper portions of the rear left leg 105 and the rear right leg 106. The hinge 500 includes a left hinge bracket 502 attached at its proximate end to the rear left leg 105 by two screws 115 and corresponding nuts (not shown), and a right hinge bracket 504 attached at its proximate end to the rear right leg 106 by two screws 115 and corresponding nuts 116 (not shown). The distal ends of the left hinge bracket 502 and the right hinge bracket 504 are attached to one another by a pivot pin 506 which may also be a screw and a corresponding nut. A rear extension limiting link 508 extends between the lower portions of the rear left leg 105 and the rear right leg 106. As best seen in FIG. 6, the rear extension limiting link 508 includes a left link bracket 600 rotatably connected at its proximate end to the lower portion of the rear left leg 105 by a pivot pin 602, which may be a screw and a corresponding nut, and a right link bracket 604 rotatably connected at its proximate end to the lower portion of the rear right leg 106 by a pivot pin 606, which may also be a screw and a corresponding nut. The distal ends of the left link bracket 600 and the right link bracket 604, are connected to one another by a horizontal limiter 608 that only allows the rear left leg 105 and the rear right leg 106 to rotate relative to one another until the link brackets 600, 604 are horizontal, thereby holding the bottom portions of the rear left leg 105 and the rear right leg 106 in a fixed position relative to one another.

As best seen in FIGS. 1, 4 and 9, the left and right side subassemblies are rotatably attached to one another at their front ends by a sliding hinge bracket 109 extending between the upper portion of the front left leg 103 and the upper portion of the front right leg 104. The sliding hinge bracket 109 provides both rotational and translational movement between the front left leg 103 and the front right leg 104. This allows the widely spaced apart parallel relationship between the left middle cross member 112 and the right middle cross member 113, for supporting a table saw, as shown in FIGS. 1 and 4, when the collapsible support frame 102 is in its operational configuration, as well as the closely spaced relationship as shown in FIG. 9, when the collapsible support frame 102 is in its compact configuration. A front extension limiting link 404 extends between the lower portion of the front left leg 103 and the lower portion of the front right leg 104. As best seen in FIG. 4, the front extension limiting link 404 includes a left link bracket 406 rotatably connected at its proximate end to the lower portion of the front left leg 103 by a pivot 408, which may be a screw and a corresponding nut, and a right link bracket 410 rotatably connected at its proximate end to the lower portion of the front right leg 104 by a pivot pin 412 which may also be a screw and a corresponding nut. The distal ends of the left link bracket 406 and the right link bracket 410 are connected to one another by a horizontal limiter 414 that only allows the front left leg 103 and the front right leg 104 to rotate relative to one another until the link brackets 406, 410 are horizontal, thereby holding the bottom portions of the front left leg 103 and the front right leg 104 in a fixed position relative to one another.

The details of the sliding hinge bracket 109 are best seen in FIGS. 4 and 9. The sliding hinge bracket 109 includes an elongated sliding bracket 416 attached to the upper surface of the right middle cross member 113 and the upper portion of the front right leg 104, at their intersection. The sliding hinge bracket 109 also includes a nesting bracket 418 attached to the upper surface of the left middle cross member 112 and the upper portion of the front left leg 103, at their intersection. The elongated sliding bracket 416 and the nesting bracket have L-shaped cross-sections. The elongated sliding bracket 416 includes an elongated planar top plate 420 and an elongated planar front plate 422 perpendicularly attached to, and integral with, the elongated planar top plate 420. The proximate end of the elongated planar top plate 420 is attached to the upper surface of the right middle cross member 113 using screws 115 and nuts (not shown). The distal end of the elongated planar top plate 420 has a linear front edge 421. The proximate end of the elongated planar front plate 422 is attached to the upper portion of the front right leg 104 using a screw 115 and a nut (not shown). The elongated planar front plate 422 includes an elongated slot 424 with a downwardly extending circular opening 426 at its proximate end and an upwardly extending circular opening 900 at its distal end. The nesting bracket 418 includes a planar top plate 428 and a planar front plate 430 perpendicularly attached to, and integral with, the planar top plate 428. The proximate end of the planar top plate 428 is attached to the upper surface of the left middle cross member 112 using screws 115 and nuts (not shown). The distal end of the planar top plate 428 has a linear front edge 429 that abuts the linear front edge 421 of the elongated planar top plate 420, when the collapsible support frame 102 is in its operational configuration, as shown in FIG. 4. The proximate end of the planar front plate 430 is attached to the upper portion of the front left leg 103 using a screw 115 and a nut (not shown). A sliding pin 432 (which may also be a screw and nut) extends through slot 424 and is connected to the distal end of the planar front plate 430.

As best seen in FIGS. 4 and 9, the left and right side subassemblies are rotatably attached to one another intermediate their ends by a hinge 434 extending between the upper portions of the left riser member 200 and the right riser member 400. The hinge 434 includes a left hinge bracket 438 attached at its proximate end to the left riser member 200 by two screws 115 and corresponding nuts 116 (not shown), and aright hinge bracket 436 attached at its proximate end to the right riser member 400 by two screws 115 and corresponding nuts 116 (not shown). The distal ends of the left hinge bracket 438 and the right hinge bracket 436 are attached to one another by a pivot 440, which may also be a screw and a corresponding nut.

Figure 2:
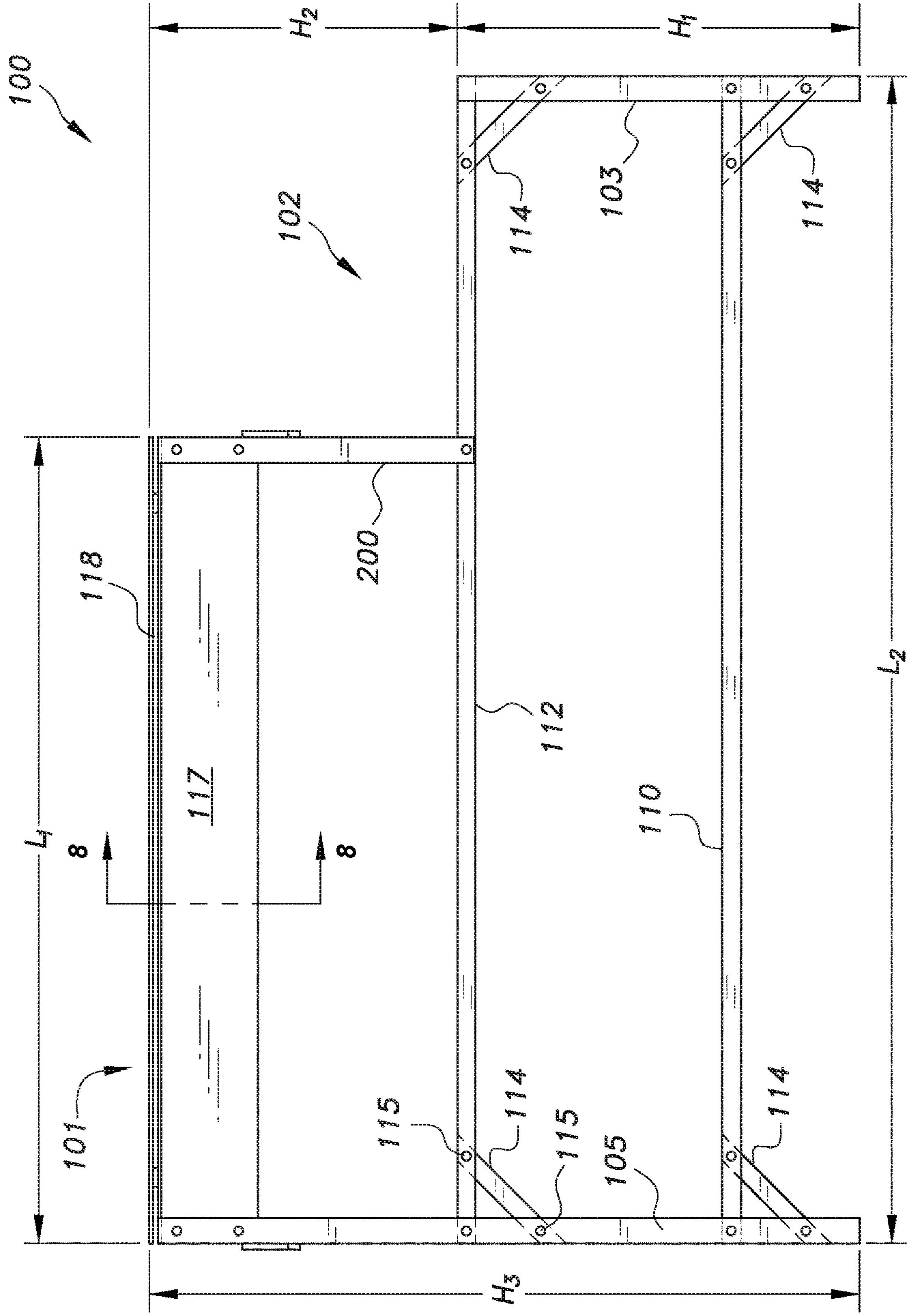
FIG. 2 is a left side, elevational view of the collapsible portable table saw stand of FIG. 1, the right side view being a mirror image thereof.
Figure 3:
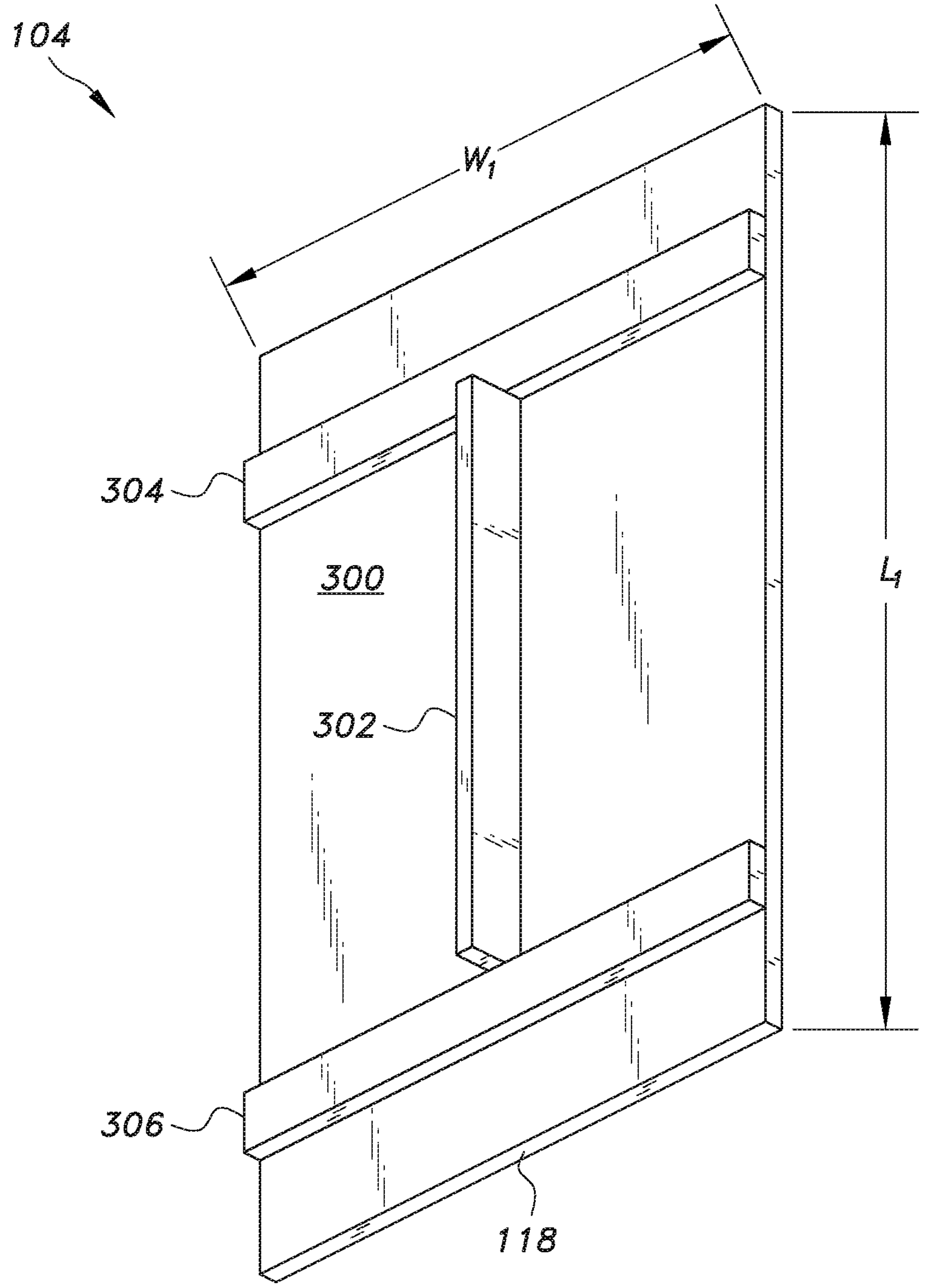
FIG. 3 is a bottom, perspective view of a worktable assembly of the collapsible portable table saw stand of FIG. 1.

The details of the worktable assembly 101 are shown in FIGS. 1-3. The worktable assembly 101 includes a planar board 118 having an upper surface 119 forming a tabletop and a lower surface 300. An elongate keel 302 depends from the lower surface 300 and extends longitudinally in the center of the planar board 118. A first reinforcement board or rib 304 extends across the width of the board 118 proximate a first end of the board 118, and a second reinforcement board or rib 306 extends across the width of the board 118 proximate a second end of the board 118. As shown, the worktable assembly 101 is generally rectangular and has a length $L_1$ and a width $W_1$. In one embodiment, the length $L_1$ is approximately 86.4 cm (34") and the width $W_1$ is approximately 58.4 cm (23"), although other sizes and shapes are possible.

As best seen in FIGS. 4-5, when the collapsible stand 102 is in its operational configuration the clamping jaw cross members 117, 402 are spaced to define a keel gap therebetween, and the tabletop elongate keel 302 is inserted and secured within the keel gap, providing a tabletop 119 spaced above the middle cross members 112, 113. The tabletop 119 extends between the upper portion of the riser members 200, 400 and the upper portions of the rear legs 105, 106, while the middle cross members 112, 113 are spaced apart to support an electric table saw thereon between the lower portions of the riser members 200, 400 and the upper portions of the front legs 103, 104.

As best seen in FIG. 2, in the operational configuration of the collapsible and portable table saw stand 100, the top surfaces of the middle cross members 112, 113 are supported at a height $H_1$, above the floor, and the tabletop 119 is supported at a height $H_2$ above the top surfaces of the middle cross members 112, 113 and a height $H_3$ above the floor. In one embodiment, $H_1$ is 61.0 cm (24"), $H_2$ is 31.8 cm (12½"), and $H_3$ is 92.7 (36½"). Also, as best seen in FIG. 2, the length of the tabletop 119 is $L_1$, and the overall length of the table saw stand 100 is $L_2$. As previously noted, in one embodiment $L_1$ is approximately 86.4 cm (34"). In one embodiment, $L_2$ is 137.16 (54"). The above, heights, widths and lengths are merely given as examples, and other dimensions are possible. It should be noted that if different electric table saws with different heights are used with the table saw stand 100, a workpiece leveler, such as the one shown in FIG. 11 of the inventor's previous U.S. Pat. No. 7,240,705 B2, may be placed on the tabletop 119 or on top of the middle cross members 112, 113, as needed.

FIGS. 9-11 show the collapsible support frame 102 in its collapsed configuration for storage or transport. One method for a user to assemble the collapsible portable table saw stand 100 is by first standing at the front of the collapsed support frame 102, as shown in FIG. 9, and grasping the upper portion of the front left leg 103 with their left hand and the upper portion of the front right leg 104 with their right hand. The user then draws the legs 103, 104 apart until the linear front edge 421 of the elongated planar top plate 420 clears the linear front edge 429 of the planar top plate 428. The user then pushes down on the horizontal limiter 414 until: the link brackets 406, 410 are horizontal; the linear front edges 421, 429 abut one another, as shown in FIG. 4; and the sliding pin 432 is in the upwardly extending circular opening 900 at the distal end of the elongated slot 424. The user then positions themselves to the rear end of the support frame 102, as shown in FIG. 10, and grasps the upper portion of the rear left leg 105 with their right hand and the upper portion of the rear right leg 106 with their left hand. The user then draws the legs 103, 104 apart slightly to define a "loose" keel gap between the clamping jaw cross members 117, 402. The user the places the worktable assembly 101 on top of the clamping jaw cross members 117, 402 with its elongate keel 302 therebetween. The user then pushes down on the horizontal limiter 608 until the link brackets 600, 604 are horizontal. The keel 302 is thereby clamped between the clamping jaw cross members 117, 402 and assembly is complete.

One method for a user to disassemble the collapsible portable table saw stand 100 is by first standing at the rear end of the assembled stand 100, shown in FIGS. 5 and 6, and pulling up the horizontal limiter 608 until the keel 302 is no longer clamped between the clamping jaw cross members 117, 402. The user can then remove the worktable assembly 101 and place it aside. The user then grasps the upper portion of the rear left leg 105 with their right hand and the upper portion of the rear right leg 106 with their left hand and pulls them apart, as shown in FIG. 10. The user then positions himself in front of the support frame 102, as shown in FIG. 4, and pulls up on the horizontal limiter 414 until the linear front edges 421, 429 clear one another and the sliding pin 432 exits the upwardly extending circular opening 900 and enters the elongated slot 424. The user can then grasp the upper portion of the front left leg 103 with their left hand and the upper portion of the front right leg 104 with their right hand and draw them together to as obtain the compact configuration shown in FIGS. 9-11.

It is to be understood that the collapsible portable table saw stand is not limited to the specific embodiments described above, but encompasses any and all embodiments within the scope of the generic language of the following claims enabled by the embodiments described herein, or otherwise shown in the drawings or described above in terms sufficient to enable one of ordinary skill in the art to make and use the claimed subject matter.

I claim:

1. A collapsible portable table saw stand, comprising:

a collapsible stand having an operational configuration and a compact configuration, the stand including opposed right- and left-side assemblies, each of the side assemblies having:

a front end portion having a front leg, the front leg including an upper portion and a lower portion;

a rear end portion having a rear legs, the rear leg including an upper portion, a middle portion, and a lower portion;

a lower cross member extending between the lower portion of the front leg and the lower portion of the rear leg;

a middle cross member extending between the upper portion of the front leg and the middle portion of the rear leg;

a riser member having an upper portion and a lower portion, the lower portion of the riser member being attached to the middle cross member between the front end portion and the rear end portion of the side assembly; and a clamping jaw cross member extending between the upper portion of the riser member and the upper portion of the rear leg, the right-side and left-side clamping jaw cross members defining a keel gap therebetween;

a sliding hinge bracket connecting the right- and left-side assemblies at the front ends of the right- and left-side assemblies; and a hinge bracket connecting the right- and left-side assemblies at the rear ends of the right- and left-side assemblies; and a worktable assembly having:

a planar board having an upper surface and a lower surface; and an elongate keel depending from the lower surface, the keel being releasably clamped in the keel gap between the right-side and left-side clamping jaw cross members when the collapsible stand is in the operational configuration so that the planar board defines a tabletop spaced above the middle cross members and extending between the upper portion of the riser members and the upper portion of the rear legs, the noddle cross members being adapted for supporting a table saw between the lower portions of the riser members and the upper portions of the front leg, such that a work table of the table saw is horizontally aligned with the upper surface of the tabletop.

2. The collapsible portable table saw stand as recited in claim 1, wherein the clamping jaw cross members of the right- and left-side assemblies are trapezoidal in cross section.

3. The collapsible portable table saw stand as recited in claim 1, wherein the front legs, the rear legs, and the riser members of the right- and left-side assemblies each comprise:

a wide elongate strip; and two narrow strips extending upward and at right angles to the wide elongate strip.

4. The collapsible portable table saw stand as recited in claim 1, wherein:

the planar board has a width, a first end, and a second end; and the worktable assembly further comprises:

a first reinforcement rib extending across the width of the lower surface of the planar board proximate the first end of the planar board; and a second reinforcement rib extending across the width of the lower surface of the planar board proximate the second end of the planar board.

5. The collapsible portable table saw stand as recited in claim 1, further comprising:

a pair of first stiffening links extending between the lower cross members and the front legs of the right- and left-side assemblies, respectively;

a pair of second stiffening links extending between the lower cross members and the rear legs of the right-and-left side assemblies, respectively;

a pair of third stiffening links extending between the middle cross members and, the front legs of the right- and left-side assemblies, respectively; and a pair of fourth stiffening links extending between the middle cross members and the rear legs of the right and left side assemblies, respectively.

6. The collapsible portable table saw stand as recited in claim 1, wherein the sliding hinge bracket comprises:

an elongated sliding bracket including:

an elongated planar top plate attached to an upper surface of the middle cross member of the right side assembly; and an elongated planar front plate extending orthogonally from the elongated planar top plate so that the elongated sliding bracket is L-shaped in section, the elongated planar front plate having a distal end defining a linear front edge and a proximate end attached to the upper portion of the front right leg, the elongated planar front plate having an elongated slot defined therein;

a nesting bracket having:

a planar top plate having a distal end defining a linear front edge and a proximate end attached to an upper surface of the left middle cross member; and a planar front plate extending orthogonally from the planar top plate of the nesting bracket, so that the nesting bracket is L-shaped in section, the planar front plate having a distal end and a proximate end attached to the upper portion of the front left leg; and a sliding pin connected to the distal end of the planar front plate of the nesting bracket and extending through the elongated slot of the elongated planar front plate of the elongated sliding bracket and; and wherein:

the linear front edge of the distal end of the planar top plate abuts the linear front edge of the distal end of the elongated planar top plate of the elongated sliding bracket, when the collapsible support frame is in its operational configuration.

7. The collapsible portable table saw stand as recited in claim 6, wherein the elongated slot defined in the elongated planar front plate of the elongated sliding bracket of said sliding hinge bracket has:

a distal end adjacent the distal end of the elongated planar front plate of the elongated sliding bracket, the distal end of the elongated slot having an upwardly extending circular opening defined therein; and a proximate end adjacent the proximate end of the elongated planar front plate of the elongated sliding bracket, the proximate end of the elongated slot having a downwardly extending circular opening defined therein.

8. The collapsible portable table saw stand as recited in claim 6, further comprising a front extension limiting link, the front extension limiting link including:

a front left link bracket having a distal end and a proximate end, the proximate end being rotatably connected to the lower portion of the front left leg;

a front right link bracket having a distal end and a proximate end, the proximate end being rotatably connected to the lower portion of the front right leg; and a front horizontal limiter connecting the distal ends of the front left link bracket and the front light link bracket, the front horizontal limiter only allowing the front left leg and the front right leg to rotate relative to one another until the link brackets are horizontal, thereby holding the bottom portions of the front left leg and the front right leg in a fixed position relative to one another when the collapsible support frame is in its operational configuration.

9. The collapsible portable table saw stand as recited in claim 8, further comprising a rear extension limiting link, the rear extension limiting link including:

a rear left link bracket having a distal end and a proximate end, the proximate end being rotatably connected to the lower portion of the rear left leg;

a rear right link bracket having a distal end and a proximate end, the proximate end being rotatably connected to the lower portion of the rear right leg; and a rear horizontal limiter connecting the distal ends of the rear left link bracket and the rear right link bracket, the rear horizontal limiter only allowing the rear left leg and the rear right leg to rotate relative to one another until the link brackets are horizontal, thereby holding the bottom portions of the rear left leg and the rear right leg in a fixed position relative to one another when the collapsible support frame is in its operational configuration.

10. The collapsible portable table saw stand as recited in claim 9, wherein the hinge bracket connecting the right- and left-side assemblies at the rear ends of the right- and left-side assemblies comprises:

a left hinge bracket having a distal end and a proximate end, the proximate end being attached to the rear left leg; and a right hinge bracket having a distal end and a proximate end, the distal end of the right hinge bracket being rotatably attached to the distal end of the left hinge bracket and the proximate end of the right hinge bracket being attached to the rear right leg.

11. The collapsible portable table saw stand as recited in claim 10, further comprising a central hinge, the central hinge including:

a central left hinge bracket having a distal end and a proximate end attached to the left riser member; and a central right hinge bracket having a distal end rotatably attached to the distal end of the central left hinge bracket and a proximate end attached to the right riser member.

* * * * *